(12) United States Patent
Ge et al.

(10) Patent No.: US 10,476,934 B2
(45) Date of Patent: *Nov. 12, 2019

(54) SYSTEM AND METHOD FOR FORWARDING A FILE

(71) Applicants: Canon Information and Imaging Solutions, Inc., Melville, NY (US); Canon U.S.A., Inc., Melville, NY (US)

(72) Inventors: Jiuyuan Ge, Centereach, NY (US); Lance Yiuchong Leung, New York, NY (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,748

(22) Filed: May 14, 2018

(65) Prior Publication Data
US 2018/0262554 A1 Sep. 13, 2018

Related U.S. Application Data

(63) Continuation of application No. 14/207,631, filed on Mar. 13, 2014, now Pat. No. 9,992,261.

(51) Int. Cl.
H04L 29/08 (2006.01)
H04L 29/12 (2006.01)
H04L 12/58 (2006.01)

(52) U.S. Cl.
CPC ............ H04L 67/06 (2013.01); H04L 29/08 (2013.01); H04L 29/1216 (2013.01); H04L 51/14 (2013.01); H04L 51/36 (2013.01); H04L 67/10 (2013.01); H04L 67/2842 (2013.01)

(58) Field of Classification Search
CPC ..... H04L 67/06; H04L 51/36; H04L 67/2842; H04L 29/1216; H04L 29/08; H04L 67/10; H04L 51/14
USPC .......................................................... 709/201
See application file for complete search history.

(56) References Cited

U.S. PATENT DOCUMENTS

2002/0193679 A1* 12/2002 Malave ................ A61M 5/172
600/407

* cited by examiner

Primary Examiner — Chris Parry
Assistant Examiner — Weiwei Y Stiltner
(74) Attorney, Agent, or Firm — Canon U.S.A., Inc. IP Division

(57) ABSTRACT

Methods, systems, and computer-readable media are provided. Some embodiments include, after receiving at least a portion of a file at a computing system, obtaining information about the file at a first time. First information is stored in a data structure, the first information comprising information that identifies the file and the information about the file at the first time. Then, information about the file at a second time after the first time is obtained. Second information is stored in a memory of the computing system, the second information comprising information that identifies the file and the information about the file at the second time. It is determined whether the second information matches the first information. In response to determining that the second information matches the first information, the file is sent from the computing system to a predetermined destination. In some embodiments, the file comprises a facsimile communication.

19 Claims, 5 Drawing Sheets

SYSTEM AND METHOD FOR FORWARDING A FILE

CROSS-REFERENCE TO RELATED APPLICATIONS

This application is a Continuation of U.S. patent application Ser. No. 14/207,631, filed Mar. 13, 2014, which is hereby incorporated by reference herein in its entirety.

BACKGROUND OF THE INVENTION

Field of the Invention

The present invention relates generally to managing network communications, and more particularly to a system and method for forwarding a file.

Description of the Related Art

Computing systems are commonly used in a network environment to share resources on the network. By way of example, a user on a client computing system may send a file to a destination at another computing system. For example, a facsimile communication may be sent from a client computing system to a server computing system.

In conventional systems, a facsimile communication may be forwarded from a recipient to a destination upon receipt of the facsimile communication.

BRIEF SUMMARY OF THE INVENTION

Methods, systems, and computer-readable media for forwarding a file are disclosed.

Some embodiments of the invention include, after receiving at least a portion of a file at a computing system, obtaining information about the file at a first time. First information is stored in a data structure, the first information comprising information that identifies the file and the information about the file at the first time, wherein, in the data structure, the information about the file at the first time is associated with the information that identifies the file. Then, information about the file at a second time after the first time is obtained. Second information is stored in a memory of the computing system, the second information comprising information that identifies the file and the information about the file at the second time. It is determined whether the second information matches the first information. In response to determining that the second information matches the first information, the file is sent from the computing system to a predetermined destination. In some embodiments, the file comprises a facsimile communication.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Figure 1:
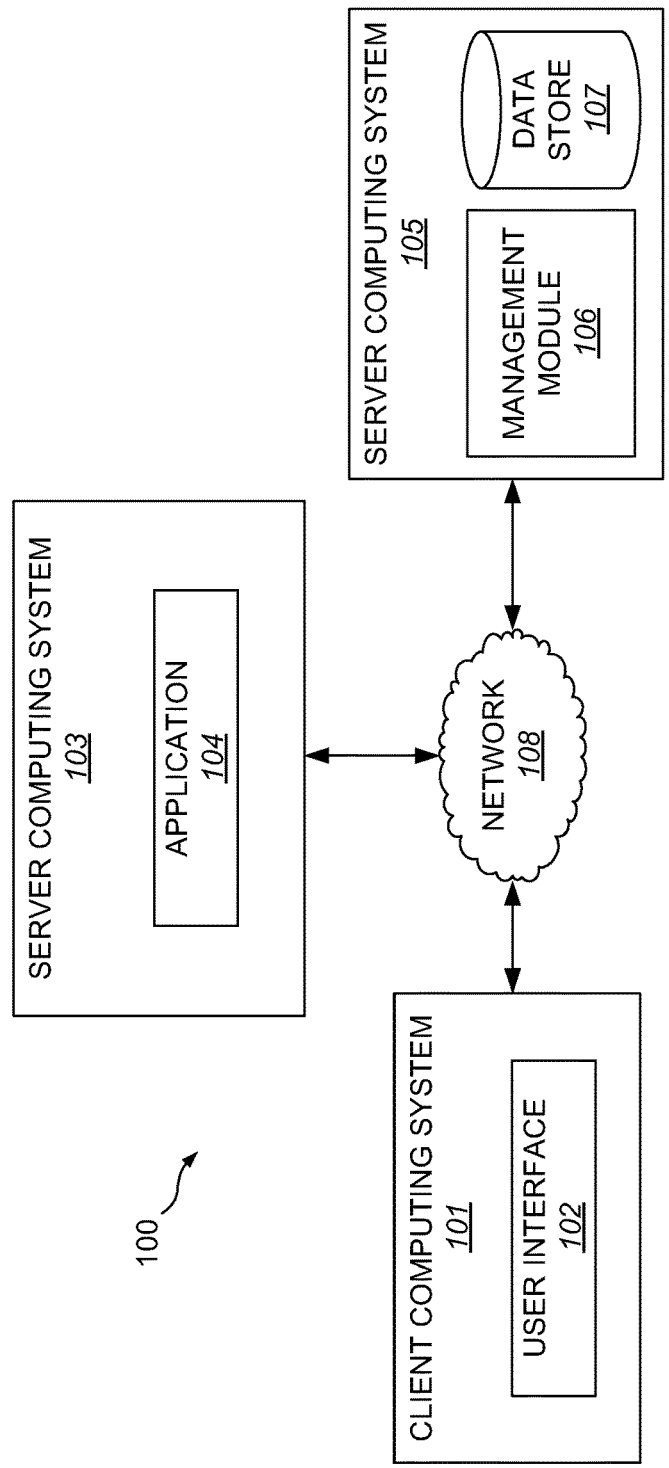
FIG. 1 illustrates an example network environment.

Embodiments of the present invention are described with reference to the drawings. FIG. 1 illustrates an example network environment 100. A client computing system 101 having a user interface 102, a server computing system 103 having an application 104, and a server computing system 105 having a management module 106 and a data store 107 are connected to a network 108.

The client computing system 101 includes hardware, software, or both for providing the functionality of the client computing system 101. In some embodiments, the client computing system 101 is unitary. In some embodiments, the client computing system 101 is distributed. The client computing system 101 may span multiple machines.

The client computing system 101 includes the user interface 102. The user interface 102 includes hardware, software, or both for providing the functionality of the user interface 102. The user interface 102 may include an operation panel. The user interface 102 may output signals and receive input signals via the operation panel so as to facilitate interaction between a user and the client computing system 101. An operation panel may include a hard key panel and/or a touch sensitive display. A user may provide user input operations via the hard key panel and/or the touch sensitive display to control the client computing system 101 via the operation panel. For example, the user may press one or more hard buttons to issue one or more commands. Further by way of example, a user may provide a touch input to an interface element displayed on the display to issue a command and/or to make a selection. Moreover, the client computing system 101 may output information to the user and issue requests by outputting images on a display.

In some embodiments, the client computing system 101 includes hardware, software, or both for providing generating and/or sending a facsimile communication. In some embodiments, the client computing system 101 includes hardware, software, or both for providing scanning functionality. For example, the client computing system 101 may include an image sensor or a camera for capturing an image. In some embodiments, the client computing system 101 scans a physical document to generate a facsimile communication representing the scanned physical document. In some embodiments, the client computing system 101 scans a physical document to generate an analog signal and sends the analog signal to a destination. In some embodiments, the client computing system 101 scans a physical document to generate electrical signals which are converted to digital image data representing the scanned physical document. The client computing system 101 may convert the digital image data into an electronic document representing the scanned physical document and send the electronic document to a destination.

In some embodiments, a browser may execute on the client computing system 101. In some embodiments, the user interface 102 comprises information displayed by the browser. The browser may be a web browser such as MICROSOFT INTERNET EXPLORER or MOZILLA FIREFOX, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The computing system 101 may have various add-ons, plug-ins, or other extensions for use in or with the browser.

The server computing system 103 includes hardware, software, or both for providing the functionality of the server computing system 103. The server computing system 103 may include one or more servers. For example, the server computing system 103 may include one or more web servers, application(s) servers, fax servers, file servers, mail servers, or print servers. In some embodiments, the server computing system 103 is unitary. In some embodiments, the server computing system 103 is distributed. The server computing system 103 may span multiple locations. The server computing system 103 may span multiple machines.

In some embodiments, the server computing system 103 performs one or more steps of one or more methods described or illustrated herein. In some embodiments, the server computing system 103 provides functionality described or illustrated herein. In some embodiments, software running on the server computing system 103 performs one or more steps of one or more methods described or illustrated herein or provides functionality described or illustrated herein. Particular embodiments include one or more portions of the server computing system 103.

The server computing system 103 includes the application 104. The application 104 includes programs and related data. In some embodiments, the application 104 executing on the server computing system 103 performs one or more steps of one or more methods described or illustrated herein or provides functionality described or illustrated herein. By way of example and not by way of limitation, programs of the application 104 may include instructions which, when executed by one or more processors, cause the one or more processors to perform one or more operations described with respect to FIG. 2.

In some embodiments, the application 104 executing on the server computing system 103 provides task-specific functionality. For example, the application 104 may include one or more programs enabling a user to perform one or more tasks. By way of example, and not by way of limitation, the application 104 may provide various functions, features and user interfaces for processing image data, transmitting data over a network, managing one or more databases, or other tasks. In some embodiments, the application 104 is configured to use one or more resources of an image processing device to perform an operation in response to an instruction from a user. For example, the application 104 may use functionality of and/or information on the image processing device to carry out an operation. The application 104 may include one or more programs for forwarding a file over a network to a predetermined destination. In some embodiments, the application may include one or more programs for forwarding a facsimile communication over a network to a predetermined destination.

The server computing system 105 includes hardware, software, or both for providing the functionality of the server computing system 105. The server computing system 105 may include one or more servers. For example, the server computing system 105 may include one or more application (s) servers, web servers, file servers, mail servers, or database servers. In some embodiments, the server computing system 105 is unitary. In some embodiments, the server computing system 105 is distributed. The server computing system 105 may span multiple locations. The server computing system 105 may span multiple machines.

The server computing system 105 includes the management module 106 and the data store 107. These components of the server computing system 105 reside in the server computing system 105 in any suitable manner. For example, these components may reside on one or multiple servers. In some embodiments, one or both of these components may be provided as part(s) of a software application. In some embodiments, one or both of these components may be provided as a stand-alone software application.

The server computing system 105 provides access to the management module 106. The management module 106 includes programs and related data. The management module 106 may include one or more programs for controlling access to the management module 106 or for controlling access to one or more resources of the management module 106. In some embodiments, the management module 106 may use an authentication service to authenticate entities seeking access to resources of the management module 106. In some embodiments, the management module 106 includes functionality for controlling access to a resource of the management module 106 based on group membership information and/or permission information associated with a user.

In some embodiments, the management module 106 executing on the server computing system 105 provides web server functionality. The management module 106 may include one or more programs for receiving Hypertext Transfer Protocol (HTTP) requests and providing HTTP responses. For example, the management module 106 may serve content in the form of a web page in response to a request from a web browser. The web page may be static or dynamic and may comprise HyperText Markup Language (HTML) files, or other suitable files, executable programs, form elements, images, or other content. One or more elements of the web page content may be stored at the server computing system 105. In some embodiments, the management module 106 uses simple object access protocol (SOAP) to receive and send messages.

In some embodiments, the management module 106 is enterprise software. The management module 106 may provide features enabling content to be shared across an organization. For example, the management module 106 may include functionality for receiving, storing, organizing, and providing access to information, files, or other content for members of an organization or group.

In some embodiments, the management module 106 provides functionality for maintaining and accessing information stored in the data store 107. The management module 106 may perform various operations with respect to the data store 107. Examples of operations include adding entries to the data store 107; deleting entries from the data store 107; modifying entries in the data store 107; searching for entries in the data store 107; and retrieving entries from the data store 107.

In some embodiments, the management module 106 provides functionality for storing a file in the data store 107 and for retrieving a file from the data store 107. The file may be an electronic document or other suitable file. Additionally, the management module 106 may provide functionality for storing information associated with the file in the data store 107. Examples of information associated with the file include information that identifies the file, information for locating the file, and information about the file.

The information in the data store 107 may be organized in any suitable manner and may be grouped for any suitable reason, such as to correspond to an organization's or a group's structure, or in accordance with user settings.

In some embodiments, the server computing system 103 may be configured to forward a file to a predetermined destination located at the server computing system 105. The server computing system 105 may be a document management system, a mail server, a File Transfer Protocol (FTP) server, a web service, or other suitable destination to which a file may be sent. In some embodiments, a file sent from the server computing system 103 to the server computing system 105 may be sent to a destination whose location is specified by information that identifies a location at the server computing system. The predetermined destination may be a directory address, an electronic mail (email) address, an FTP address, or other suitable address. The file may be sent from the server computing system 103 to the server computing system 105 using any suitable protocol including, by way of example, FTP, simple mail transfer protocol (SMTP), serial management protocol (SMP), SOAP, or other suitable protocol.

The network 108 couples one or more servers and one or more clients to each other. The network 108 may be any suitable network. For example, one or more portions of the network 108 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 108 may include one or more networks.

Figure 2:
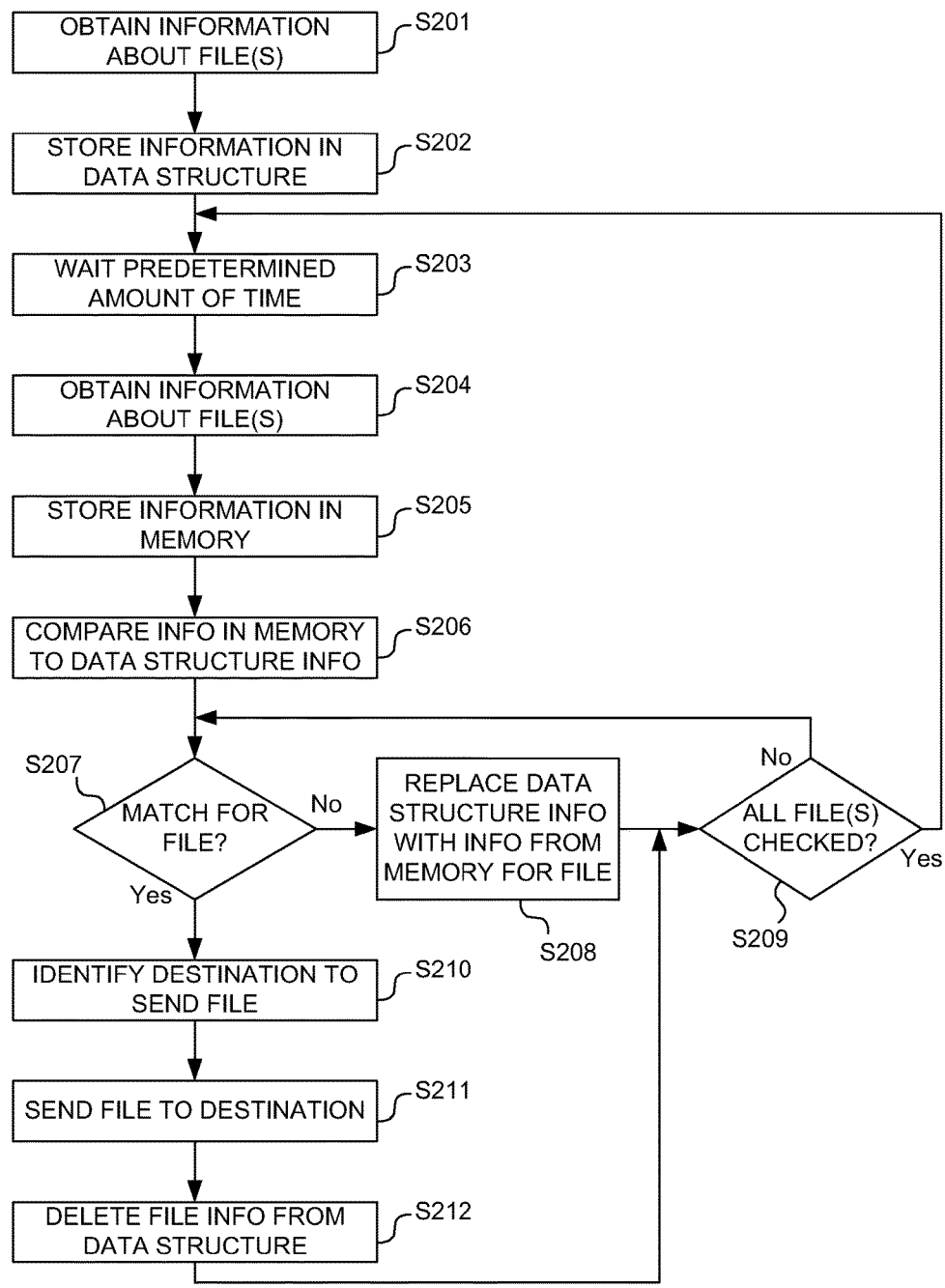
FIG. 2 illustrates an example flow of operations at a server computing system.

FIG. 2 is described with reference to the example network environment 100 of FIG. 1. FIG. 2 illustrates an example flow of operations at the server computing system 103.

In step S201, the server computing system 103 obtains information about a file at a first time. In some embodiments, the server computing system 103 receives this information receiving at least a portion of a file at the server computing system 103. The application 104 executing on the server computing system 103 may be periodically checking a folder at a storage location on the server computing system 103. For example, the application 104 may run a program on a loop; such that the application 104 takes a snap shot of the contents of a monitored folder on the server computing system 103 periodically. Accordingly, at a first time, the application 104 on the server computing system 103 may take a snap shot of all of the files in the folder at a first time and thereby obtain information about the each file at the first time. In some embodiments, one or more files in the folder comprise respective facsimile communications. The files may be all or a portion of a file. For example, each file may be all or a portion of a facsimile communication.

In some embodiments, the information about the file at the first time is information indicating a time the file was last written to as of the first time and information indicating a size of the file at the first time. For example, the information indicating a time the file was last written to as of the first time may be LastWriteTime information for the file and it may indicate a time the file was last written to in the folder. Additionally or alternatively, in some embodiments, the information about the file at the first time may include information indicating a size of the file at the first time. For example, the information indicating the size of the file at the first time may be FileSize information. The information about the file at the first time may be in any suitable format.

Figure 3:
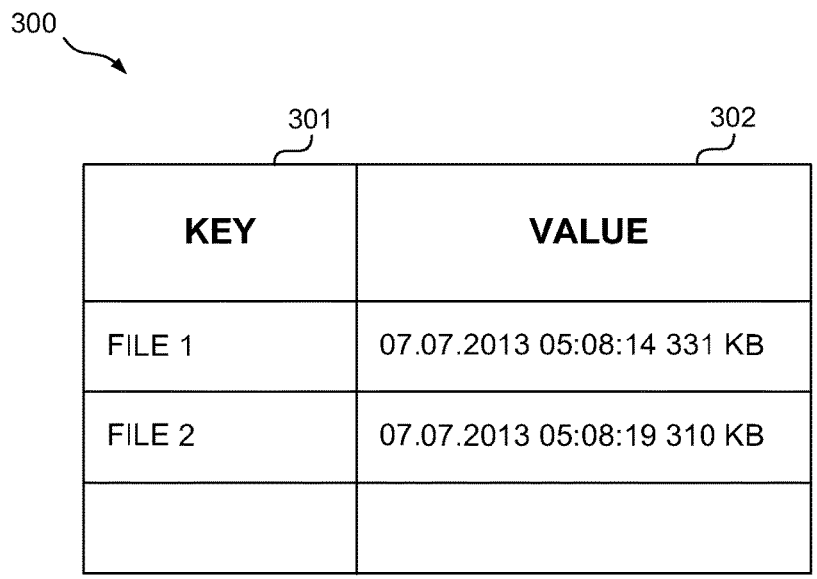
FIG. 3 illustrates an example data structure.

In step S202, the server computing system 103 stores information in a data structure. The server computing system 103 may store first information in a data structure. The first information may be information that identifies the file and the information about the file at the first time that was obtained in step S201. In some embodiments, the information about the file at the first time is associated, in a data structure, with the information that identifies the file. For example, as illustrated in FIG. 3, information that identifies the file may be a file name such as "File 1" and the information that identifies the file may be associated with information that identifies the file such as LastWriteTime or FileSize information obtained in step S201.

In step S203, the server computing system 103 waits a predetermined amount of time. For example, the server computing system 103 may monitor a timer and the determine that a lapse of a predetermined amount of time since the first time has occurred. Upon determining the predetermined amount of time has lapsed, the process advances to step S204.

In step S204, the server computing system 103 obtains information about file(s) at a second time. In step S204, the server computing system 103 takes a snap shot of the same folder as in step S201 in order to obtain information about the contents of the folder at the second time. The operation performed in step S201 is repeated in step S204.

In step S205, the server computing system 103 stores second information in a memory of the server computing system 103, the second information comprising information that identifies the file and the information about the file at the second time. The second information may be stored in a cache memory of the server computing system 103.

The information about the file at the second time is information indicating a time the file was last written to as of the second time and information indicating a size of the file at the second time. For example, the information indicating a time the file was last written to as of the second time may be LastWriteTime information for the file and it may indicate a time the file was last written to in the folder. Additionally or alternatively, in some embodiments, the information about the file at the second time may include information indicating a size of the file at the second time. For example, the information indicating the size of the file at the first time may be FileSize information. The information about the file at the first time may be in any suitable format.

In step S206, the server computing system 103 compares the information stored in step S205 to the information stored in step S202. The information is compared for each file for which information was obtained during the snap shots.

In step S207, if it is determined that there was a match between the first information and the second information, then the server computing system identifies a predetermined destination in step S210 based on a configuration parameter indicating a destination for the server computing system 103 to forward the file. The file may be a facsimile communication. The configuration parameter may be information that identifies the predetermined destination.

In step S211, the server computing system 103 sends the file to the destination identified in step S210. At step S212, the server computing system deletes the file.

On the other hand, if the first information does not match the second information in step S207, then the process advances to step S208.

Figure 4:
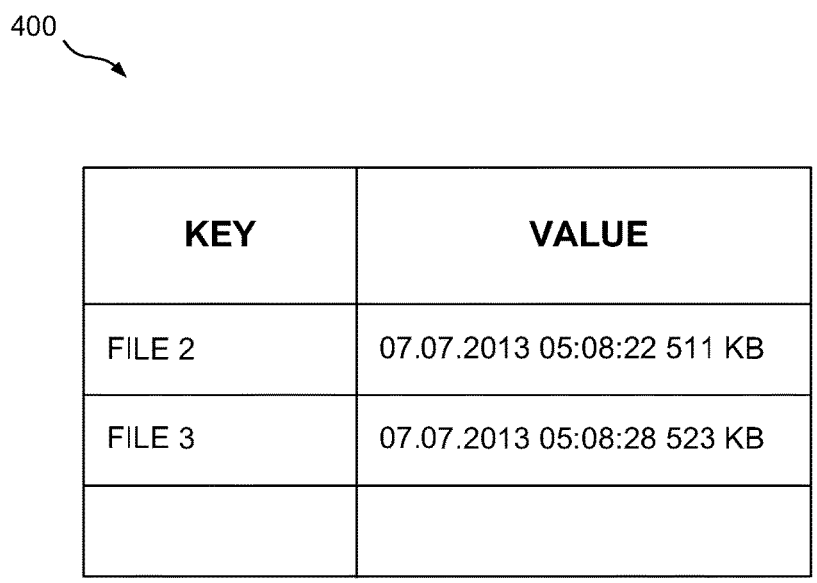
FIG. 4 illustrates an example data structure.

In step S208, the second information (i.e., the information in memory) replaces the information in the data structure. For example, in FIG. 4, a second data structure is shown. In the example of FIG. 4, the file named File 1 is no longer present because a match between data in memory and data in the data structure of FIG. 3 was identified. In other words, between the first time and the second time, there was no change between the values for File 1. However, for File 2, there was a change, so File 2's new information is now stored in the data structure in FIG. 4. Still further for File 3, at the second time File 3 was newly found in the folder during the snap shot. Thus, File 3 is now newly added to the data structure.

At step S209, the process repeats for each file in the data structure.

If all files have been checked, the process returns to step S203.

Figure 5:
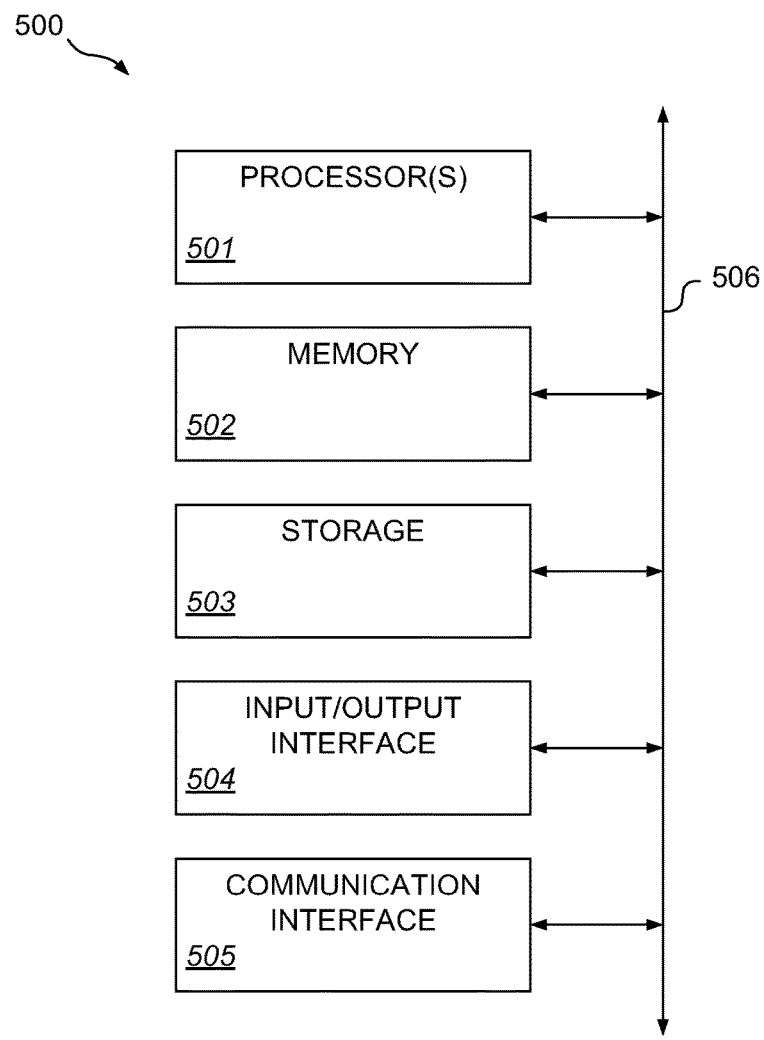
FIG. 5 illustrates an example computing system.

FIG. 5 illustrates an example computing system 500. According to various embodiments, all or a portion of the description of the computing system 500 is applicable to all or a portion of one or more of the client computing system 101, the server computing system 103, and the server computing system 105.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 500 performs one or more steps of one or more methods described or illustrated herein. In some embodiments, the computing system 500 provides functionality described or illustrated herein. In some embodiments, software running on the computing system 500 performs one or more steps of one or more methods described or illustrated herein or provides functionality described or illustrated herein. Some embodiments include one or more portions of the computing system 500.

The computing system 500 includes one or more processor(s) 501, memory 502, storage 503, an input/output (I/O) interface 504, a communication interface 505, and a bus 506. The computing system 500 may take any suitable physical form. For example, and not by way of limitation, the computing system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 501 include hardware for executing instructions, such as those making up a computer program. The processor(s) 501 may retrieve the instructions from the memory 502, the storage 503, an internal register, or an internal cache. The processor(s) 501 then decode and execute the instructions. Then, the processor(s) 501 write one or more results to the memory 502, the storage 503, the internal register, or the internal cache. The processor(s) 501 may provide the processing capability to execute the operating system, programs, user and application interfaces, and any other functions of the computing system 500.

The processor(s) 501 may include a central processing unit (CPU), one or more general-purpose microprocessor(s), application-specific microprocessor(s), and/or special purpose microprocessor(s), or some combination of such processing components. The processor(s) 501 may include one or more graphics processors, video processors, audio processors and/or related chip sets.

In some embodiments, the memory 502 includes main memory for storing instructions for the processor(s) 501 to execute or data for the processor(s) 501 to operate on. By way of example, the computing system 500 may load instructions from the storage 503 or another source to the memory 502. During or after execution of the instructions, the processor(s) 501 may write one or more results (which may be intermediate or final results) to the memory 502. One or more memory buses (which may each include an address bus and a data bus) may couple the processor(s) 501 to the memory 502. One or more memory management units (MMUs) may reside between the processor(s) 501 and the memory 502 and facilitate accesses to the memory 502 requested by the processor(s) 501. The memory 502 may include one or more memories. The memory 502 may be random access memory (RAM).

The storage 503 stores data and/or instructions. As an example and not by way of limitation, the storage 503 may include a hard disk drive, a floppy disk drive, flash memory, an optical disc, a magneto-optical disc, magnetic tape, or a Universal Serial Bus (USB) drive or a combination of two or more of these. In some embodiments, the storage 503 is a removable medium. In some embodiments, the storage 503 is a fixed medium. In some embodiments, the storage 503 is internal to the computing system 500. In some embodiments, the storage 503 is external to the computing system 500. In some embodiments, the storage 503 is non-volatile, solid-state memory. In some embodiments, the storage 503 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 503 may include one or more memory devices. One or more program modules stored in the storage 503 may be configured to cause various operations and processes described herein to be executed.

The I/O interface 504 includes hardware, software, or both providing one or more interfaces for communication between the computing system 500 and one or more I/O devices. The computing system 500 may include one or more of these I/O devices, where appropriate. One or more of these I/O devices may enable communication between a person and the computing system 500. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 504 includes one or more device or software drivers enabling the processor(s) 501 to drive one or more of these I/O devices. The I/O interface 504 may include one or more I/O interfaces.

The communication interface 505 includes hardware, software, or both providing one or more interfaces for communication (such as, for example, packet-based communication) between the computing system 500 and one or more other computing systems or one or more networks. As an example and not by way of limitation, the communication interface 505 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 505 for it. As an example and not by way of limitation, the computing system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 500 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 500 may include any suitable communication interface 505 for any of these networks, where appropriate. The communication interface 505 may include one or more communication interfaces 505.

The bus 506 interconnects various components of the computing system 500 thereby enabling the transmission of data and execution of various processes. The bus 506 may include one or more types of bus structures including a memory bus or memory controller, a peripheral bus, and a local bus using any of a variety of bus architectures.

Figure 6:
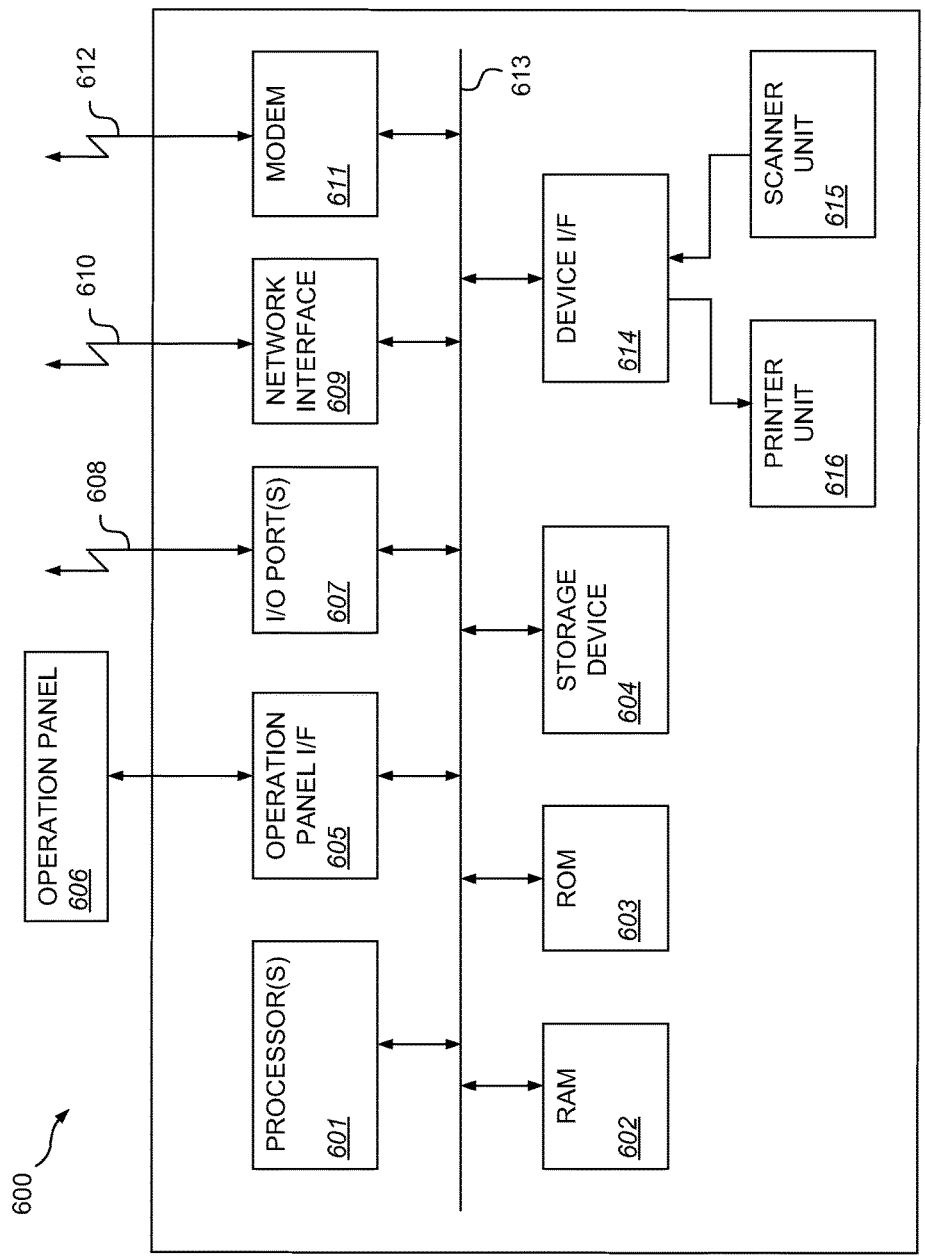
FIG. 6 illustrates an example image processing device.

FIG. 6 illustrates an example image processing device 600. In some embodiments, the server computing system 103 of FIG. 1 comprises the image processing device 600. The image processing device 600 of FIG. 6 is a multifunction peripheral having a scanning function in addition to printing, copying and other functions. However, it will be understood that various other implementations of an image processing device are within the scope of the present invention. For example, various components, modules, functions, and/or configurations of the image processing device 600 of FIG. 6 could be combined, deleted, or modified to form further implementations. Further by way of example, in some embodiments, other devices (for example, other devices having scanning capabilities) and/or computing systems (for example, a computer connected to a scanner) may be implemented as the image processing device 600.

In some embodiments, the image processing device 600 performs one or more operations described herein. In some embodiments, the image processing device 600 provides functionality described herein. In some embodiments, software running on the image processing device 600 performs one or more operations described herein.

The image processing device 600 includes one or more processor(s) 601. The processor(s) 601 include a central processing unit (CPU) that performs overall control functions for the image processing device 600. The CPU uses a random access memory (RAM) 602 as a work area while executing instructions. The CPU executes instructions of various programs stored in one or more memory devices. For example, the CPU executes programs stored in a read only memory (ROM) 603 and in a storage device 604.

In some embodiments, the processor(s) 601 include one or more processors in addition to the CPU. By way of example, the processor(s) 601 may include one or more general-purpose microprocessor(s), application-specific microprocessor(s), and/or special purpose microprocessor(s). Additionally, in some embodiments the processor(s) 601 may include one or more internal caches for data or instructions.

The processor(s) 601 provide the processing capability required to execute an operating system, application programs, and various other functions provided on the image processing device 600. The processor(s) 601 perform or cause components of the image processing device 600 to perform various operations and processes described herein, in accordance with instructions stored in one or more memory devices.

The RAM 602 is used as a work area when the processor(s) 601 execute various instructions, such as those making up computer programs stored in the ROM 603 and/or the storage device 604. The RAM 602 may be used as a temporary storage area for various data, including input image data. The RAM 602 may be used as a cache memory. In some embodiments, the RAM may be dynamic RAM (DRAM) or static RAM (SRAM).

The ROM 603 stores data and programs having computer-executable instructions for execution by the processor(s) 601. In some embodiments, the ROM 603 is a boot ROM, storing instructions for the booting process. In some embodiments, the ROM 603 may be flash memory.

The storage device 604 stores application data, program modules and other information. One or more program modules stored in the storage device 604 are configured to cause various operations and processes described herein to be executed. In some embodiments, the application 104 resides on the storage device 604 and executes on the image processing device 600.

The storage device 604 also stores other programs and data to be processed. For example, the storage device 604 stores an operating system including programs and data for managing hardware and software components of the image processing device 600. Applications on the image processing device 600 may utilize the operating system to perform various operations. The storage device 604 may further store other programs and/or drivers that enable various functions of the image processing device 600, graphical user interface (GUI) functions, and/or processor functions. The storage device 604 may also store data files including, for example, image data, user data, configuration information, GUI components, such as graphical elements or templates, or other data required by the image processing device 600.

In some embodiments, the image processing device 600 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 600. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 605 provides output signals to and receives input signals from an operation panel 606. Regarding the output signals, the operation panel interface 605 provides GUI data to the operation panel 606 for display on a liquid crystal display (LCD). Regarding the input signals, the operation panel interface 605 receives input signals based on user input operations at the operation panel 606 and relays the input signals to the processor(s) 601. In some embodiments, the operation panel 606 includes a touch sensitive element operable to receive user input operations or commands based on the touching of graphical objects displayed on the LCD. In some embodiments, the operation panel 606 includes a hard key panel.

The image processing device 600 includes one or more input/output (I/O) port(s) 607. The I/O port(s) 607 may include any suitable interface type such as a universal serial bus (USB) port, FireWire port (IEEE-1394), serial port, parallel port, or AC/DC power connection port. The I/O port(s) 607 enable one or more external device(s) 608 to communicate with the image processing device 600 when the external device(s) 608 is/are connected to the I/O port(s) 607. Examples of external devices 608 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 609 includes hardware, software, or both providing one or more interfaces for communication (such as, for example, packet-based communication) between the image processing device 600 and one or more other computing systems or one or more networks 610. As an example and not by way of limitation, the network interface 609 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 610 and any suitable network interface 609 for it. As an example and not by way of limitation, the image processing device 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 610 may be wired or wireless. As an example, the image processing device 600 may communicate with a wireless PAN (WPAN) (such as, for example, a BLUETOOTH WPAN), a WI-FI network, a WI-MAX network, or other suitable wireless network or a combination of two or more of these. The image processing device 600 may include any suitable network interface 609 for any of these networks 610, where appropriate.

A modem 611 modulates/demodulates image data and control signals. The modem 611 is connected to the Public Switched Telephone Network (PSTN) 612 and performs input/output of information between the image processing device 600 and the PSTN 612. By way of example, the modem 611 may send/receive facsimile communications.

A system bus 613 interconnects various components of the image processing device 600 thereby enabling the transmission of data and execution of various processes. The system bus 613 may include one or more types of bus structures including a memory bus or memory controller, a peripheral bus, and a local bus using any of a variety of bus architectures.

The device interface 614 is connected to the scanner unit 615 and to the printer unit 616. The device interface 614 performs synchronous/asynchronous conversion of image data.

The scanner unit 615 includes a light source and an image sensor. The scanner unit 615 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 615 includes an optical system (for example, mirrors, lens) that directs the light to the image sensor. After the image sensor generates the electrical signals, an analog-to-digital converter converts the electrical signals to digital image data representing the scanned physical document. The scanner unit 615 then outputs the digital image data to one or more other components of the image processing device 600 via the device interface 614.

The printer unit 616 is an image output device for printing on a sheet an image corresponding to image data. In response to a print command received at the image processing device 600, the printer unit 616 receives image data via the device interface 614 and outputs to a sheet an image corresponding to the image data.

Various above-described operations performed by the client computing system 101, the server computing system 103, and the server computing system 105 may be executed and/or controlled by one or more applications running on the client computing system 101, the server computing system 103, and the server computing system 105, respectively. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A method comprising:
    after receiving at a computing system and writing to one or more memories on the computing system data of a file, obtaining information indicating a size of the file at a first time based on an amount of the data of the file that have been written to the one or more memories on the computing system as of the first time;
    obtaining information indicating a size of the file at a second time based on an amount of data of the file that have been written to the one or more memories on the computing system as of the second time, the second time after the first time;

determining that the information indicating the size of the file at the second time does not match the information indicating the size of the file at the first time;

obtaining information indicating a size of the file at a third time based on an amount of data of the file that have been written to the one or more memories on the computing system as of the third time, the third time after the second time;

determining whether the information indicating the size of the file at the third time matches the information indicating the size of the file at the second time by comparing the information indicating the size of the file at the third time with the information indicating the size of the file at the second time; and in response to determining that the information indicating the size of the file at the third time matches the information indicating the size of the file at the second time, sending, from the computing system to a destination, the file.

2. The method of claim 1, wherein the data of the file that have been written to the one or more memories on the computing system as of the first time comprise a first portion of the file, and wherein, after the first time, the computing system receives a second portion of the file different from the first portion of the file.

3. The method of claim 2, wherein the data of the file that have been written to the one or more memories on the computing system as of the second time comprise the first portion of the file and the second portion of the file.

4. The method of claim 2, wherein sending the file comprises sending, from the computing system to the destination, all of the file including at least the first portion of the file and the second portion of the file.

5. The method of claim 1, wherein the information indicating the size of the file at the first time includes information indicating a first file size, and wherein the information indicating the size of the file at the second time includes information indicating a second file size greater than the first file size.

6. The method of claim 1, further comprising:
determining that a lapse of a predetermined amount of time since the first time has occurred, wherein the obtaining information indicating the size of the file at the second time is performed in response to the determining that the lapse of the predetermined amount of time since the first time has occurred.

7. The method of claim 1, wherein determining that the information indicating the size of the file at the third time matches the information indicating the size of the file at the second time includes determining that a file size of the file at the third time is the same as a file size of the file at the second time.

8. The method of claim 1, further comprising:
before sending the file to the destination from the computing system, identifying the destination to which the file is to be sent.

9. The method of claim 1, wherein the file comprises a facsimile communication.

10. A non-transitory computer-readable medium storing executable instructions, which when executed by a computing system with one or more processors, cause the computing system to:

after receiving at the computing system and writing to one or more memories on the computing system data of a file, obtain information indicating a size of the file at a first time based on an amount of the data of the file that have been written to the one or more memories on the computing system as of the first time;

obtain information indicating a size of the file at a second time based on an amount of data of the file that have been written to the one or more memories on the computing system as of the second time, the second time after the first time;

determine that the information indicating the size of the file at the second time does not match the information indicating the size of the file at the first time;

obtain information indicating a size of the file at a third time based on an amount of data of the file that have been written to the one or more memories on the computing system as of the third time, the third time after the second time;

determine whether the information indicating the size of the file at the third time matches the information indicating the size of the file at the second time by comparing the information indicating the size of the file at the third time with the information indicating the size of the file at the second time; and in response to determining that the information indicating the size of the file at the third time matches the information indicating the size of the file at the second time, send, from the computing system to a destination, the file.

11. A system comprising:
one or more processors; and
one or more memories storing executable instructions, which when executed by the one or more processors, cause a computing system to:

after receiving at the computing system and writing to the one or more memories on the computing system data of a file, obtain information indicating a size of the file at a first time based on an amount of the data of the file that have been written to the one or more memories on the computing system as of the first time;

obtain information indicating a size of the file at a second time based on an amount of data of the file that have been written to the one or more memories on the computing system as of the second time, the second time after the first time;

determine that the information indicating the size of the file at the second time does not match the information indicating the size of the file at the first time;

obtain information indicating a size of the file at a third time based on an amount of data of the file that have been written to the one or more memories on the computing system as of the third time, the third time after the second time;

determine whether the information indicating the size of the file at the third time matches the information indicating the size of the file at the second time by comparing the information indicating the size of the file at the third time with the information indicating the size of the file at the second time; and in response to determining that the information indicating the size of the file at the third time matches the information indicating the size of the file at the second time, send, from the computing system to a destination, the file.

12. The system of claim 11, wherein the data of the file that have been written to the one or more memories on the computing system as of the first time comprise a first portion of the file, and wherein, after the first time, the computing system receives a second portion of the file different from the first portion of the file.

13. The system of claim 12, wherein the data of the file that have been written to the one or more memories on the computing system as of the second time comprise the first portion of the file and the second portion of the file.

14. The system of claim 12, wherein the file sent to the destination includes at least the first portion of the file and the second portion of the file.

15. The system of claim 11, wherein the information indicating the size of the file at the first time includes information indicating a first file size, and
wherein the information indicating the size of the file at the second time includes information indicating a second file size greater than the first file size.

16. The system of claim 11, wherein the executable instructions, when executed by the one or more processors, further cause the computing system to:
determine that a lapse of a predetermined amount of time since the first time has occurred,
wherein the information indicating the size of the file at the second time is obtained in response to determining that the lapse of the predetermined amount of time since the first time has occurred.

17. The system of claim 11, wherein determining that the information indicating the size of the file at the third time matches the information indicating the size of the file at the second time includes determining that a file size of the file at the third time is the same as a file size of the file at the second time.

18. The system of claim 11, wherein the executable instructions, when executed by the one or more processors, further cause the computing system to:
before sending the file to the destination from the computing system, identify the destination to which the file is to be sent.

19. The system of claim 11, wherein the file comprises a facsimile communication.

* * * * *